US009090487B2

United States Patent
Ellis

(10) Patent No.: US 9,090,487 B2
(45) Date of Patent: Jul. 28, 2015

(54) WATER TREATMENT APPARATUS INCORPORATING WET AIR REGENERATION AND POWDERED ACTIVATED CARBON TREATMENT

(71) Applicant: Claude E. Ellis, Walnut, CA (US)

(72) Inventor: Claude E. Ellis, Walnut, CA (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/043,146

(22) Filed: Oct. 1, 2013

(65) Prior Publication Data

US 2014/0116952 A1 May 1, 2014

Related U.S. Application Data

(60) Provisional application No. 61/718,784, filed on Oct. 26, 2012.

(51) Int. Cl.
| | | |
|---|---|---|
| C02F 1/28 | (2006.01) | |
| B01D 15/20 | (2006.01) | |
| B01J 20/34 | (2006.01) | |

(Continued)

(52) U.S. Cl.
CPC .............. *C02F 1/281* (2013.01); *B01D 15/203* (2013.01); *B01J 20/3416* (2013.01); *C02F 1/283* (2013.01); *C02F 3/1226* (2013.01); *C02F 1/42* (2013.01); *C02F 3/1221* (2013.01); *C02F 11/08* (2013.01); *C02F 11/12* (2013.01); *C02F 2003/003* (2013.01); *C02F 2209/10* (2013.01); *C02F 2303/08* (2013.01); *C02F 2303/16* (2013.01); *C02F 2303/22* (2013.01)

(58) Field of Classification Search
CPC ............ C02F 1/281; C02F 1/283; C02F 1/42; C02F 3/1221; C02F 3/1226; C02F 11/08; C02F 11/12; C02F 2003/003; C02F 2209/10; C02F 2303/08; C02F 2303/16; C02F 2303/22; B01D 15/203
USPC .................. 210/614–618, 620, 621–626, 761
See application file for complete search history.

(56) References Cited

U.S. PATENT DOCUMENTS

| | | | |
|---|---|---|---|
| 3,458,439 A | * | 7/1969 | Schmidt ........................ 210/673 |
| 3,977,966 A | | 8/1976 | Pradt et al. |

(Continued)

FOREIGN PATENT DOCUMENTS

EP      0278745 A2      8/1988

OTHER PUBLICATIONS

Shende, R.V., et al., "Wet oxidative regeneration of activated carbon loaded with a reactive dye," Waste Management 22 (2002) 72-83.*

(Continued)

*Primary Examiner* — Chester Barry

(57) ABSTRACT

A water treatment system (100) incorporating a solubles concentration reduction device (104) between a powdered activated carbon treatment (PACT) system (106) and a wet air regeneration (WAR) system (108). Soluble components may be removed by sequentially dewatering (20) then re-slurrying (28) spent carbon sludge (18). The reduced concentration of soluble materials reduces the need for scale removal maintenance and eliminates the necessity for exotic materials of construction of the WAR system components. The solubles concentration reduction device also facilitates active control of the solids concentration being delivered to the WAR system.

9 Claims, 2 Drawing Sheets

(51) Int. Cl.
  *C02F 1/42*   (2006.01)
  *C02F 3/12*   (2006.01)
  *C02F 11/08*  (2006.01)
  *C02F 11/12*  (2006.01)
  *C02F 3/00*   (2006.01)

(56) References Cited

U.S. PATENT DOCUMENTS

| | | | | |
|---|---|---|---|---|
| 4,237,002 | A | * | 12/1980 | Strudgeon et al. ............ 210/631 |
| 4,670,162 | A | * | 6/1987 | Robey ............................ 210/761 |
| 4,812,243 | A | | 3/1989 | Brandenburg et al. |
| 4,857,198 | A | * | 8/1989 | Meidl ............................ 210/603 |
| 5,486,292 | A | * | 1/1996 | Bair et al. ...................... 210/616 |
| 6,379,562 | B1 | * | 4/2002 | Burdeniuc ..................... 210/761 |
| 7,678,268 | B2 | | 3/2010 | Smith et al. |
| 8,801,932 | B2 | * | 8/2014 | Gattrell ......................... 210/631 |
| 2007/0209999 | A1 | * | 9/2007 | Smith et al. ................... 210/631 |
| 2009/0101583 | A1 | * | 4/2009 | Perry ............................ 210/664 |

OTHER PUBLICATIONS

Siemens Water Technologies, "PACT® and WAR Systems: Cleaner Treated Effluents, Lower Operating Costs", @2010 Siemens Water Technologies Corp., OGS-PACTWAR-BR-0610, pp. 1-8.*

Kevin J. Deeny et al., "Performance of Activated Sludge—Powered Activated Carbon—Wet Air Regeneration Systems", United States Environmental Protection Agency, Risk Reduction Engineering Laboratory, Cincinnati, OH, Research and Development, EPA/600/S2-90/012 Aug. 1990, pp. 1-8.*

Siemens Water Technologies, "PACT® WAR Systems: Cleaner Treated Effuluents, Lower Operating Costs", © 2010 Siemens Water Technologies Corp., OGS-PACTWAR-BR-0610, pp. 1-8.

Clayton B. Maugans et al., "Wet Air Oxidation: A Review of Commercial Sub-critical Hydrothermal Treatment", IT3'02 Conference, May 13-17, 2002. New Orleans, Louisiana, pp. 1-16.

* cited by examiner

WATER TREATMENT APPARATUS INCORPORATING WET AIR REGENERATION AND POWDERED ACTIVATED CARBON TREATMENT

This application claims benefit of the 26 Oct. 2012 filing date of U.S. Provisional Patent Application No. 61/718,784, which is incorporated by reference herein.

FIELD OF THE INVENTION

The present invention relates generally to water treatment systems, and, more particularly, to water treatment systems that utilize powdered activated carbon.

BACKGROUND OF THE INVENTION

Powdered activated carbon treatment (PACT) systems combine biological treatment and carbon adsorption into a single synergistic step. The result is superior pollutant removal efficiencies. Wet air regeneration (WAR) systems utilize high temperature and pressure conditions for regenerating spent carbon from PACT systems while simultaneously oxidizing the biological solids accompanying the spent carbon. Notwithstanding advances which have been made in this technical field, there continues to be a need for water treatment systems that provide increased reliability and reduced construction, operation and maintenance costs.

BRIEF DESCRIPTION OF THE DRAWINGS

The invention is explained in the following description in view of the drawings that show.

DETAILED DESCRIPTION OF THE INVENTION

The present inventor has innovatively overcome certain limitations in connection with water treatment systems that incorporate wet air regeneration (WAR) of powdered activated carbon. The inventor has recognized that the presence of certain soluble components (e.g., water-hardening components, such as calcium, magnesium, iron, etc., which may be generally present in ionized form) in sludge from a PACT system can lead to substantial scaling in certain components of the WAR system, such as valves, heat exchangers, reactor, etc. that operate at elevated temperature and pressure Removal of scale entails costly and burdensome maintenance, which in turn require the handling and disposal of hazardous substances such as nitric acid. Additionally, the presence of other soluble components, (e.g., corrosive components, such as chlorides, fluorides, etc., which may also be generally present in ionized form) in the sludge from the PACT system requires utilization of expensive materials with advanced metallurgical properties to withstand stress corrosion in those components of the WAR system. The present inventor proposes an innovative apparatus and method which removes or at least substantially reduces the concentration of such undesirable soluble components prior to treatment in a WAR system.

Figure 3:
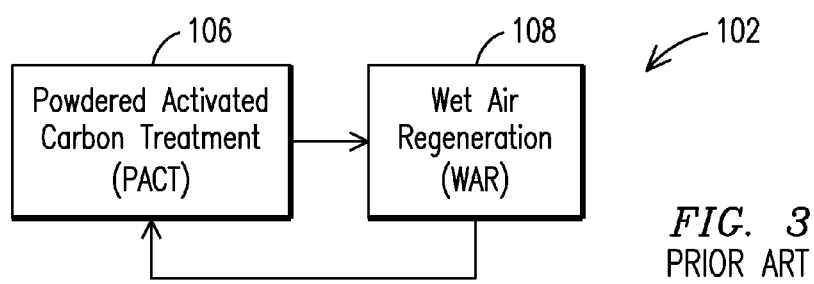
FIG. 3 is a prior art water treatment system.
Figure 4:
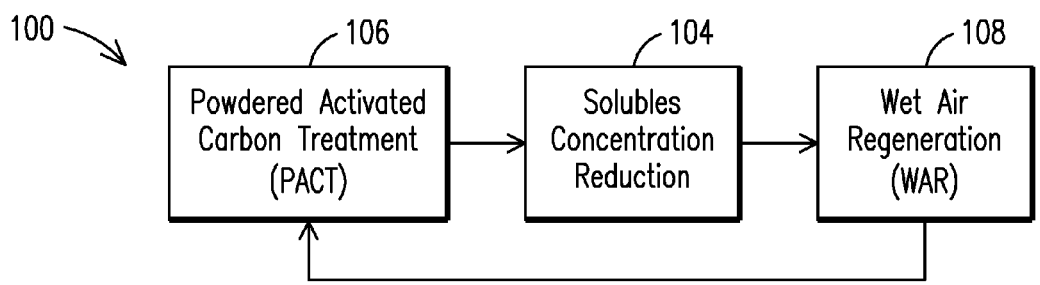
FIG. 4 is a water treatment system in accordance with an embodiment of the invention.

A water treatment system 100 in accordance with an aspect of the invention is conveniently compared to a typical prior art water treatment system 102 by comparing FIGS. 3 and 4. The invention includes a solubles concentration reduction step or apparatus 104 between the powdered activated carbon treatment 106 and the wet air regeneration 108.

Figure 1:
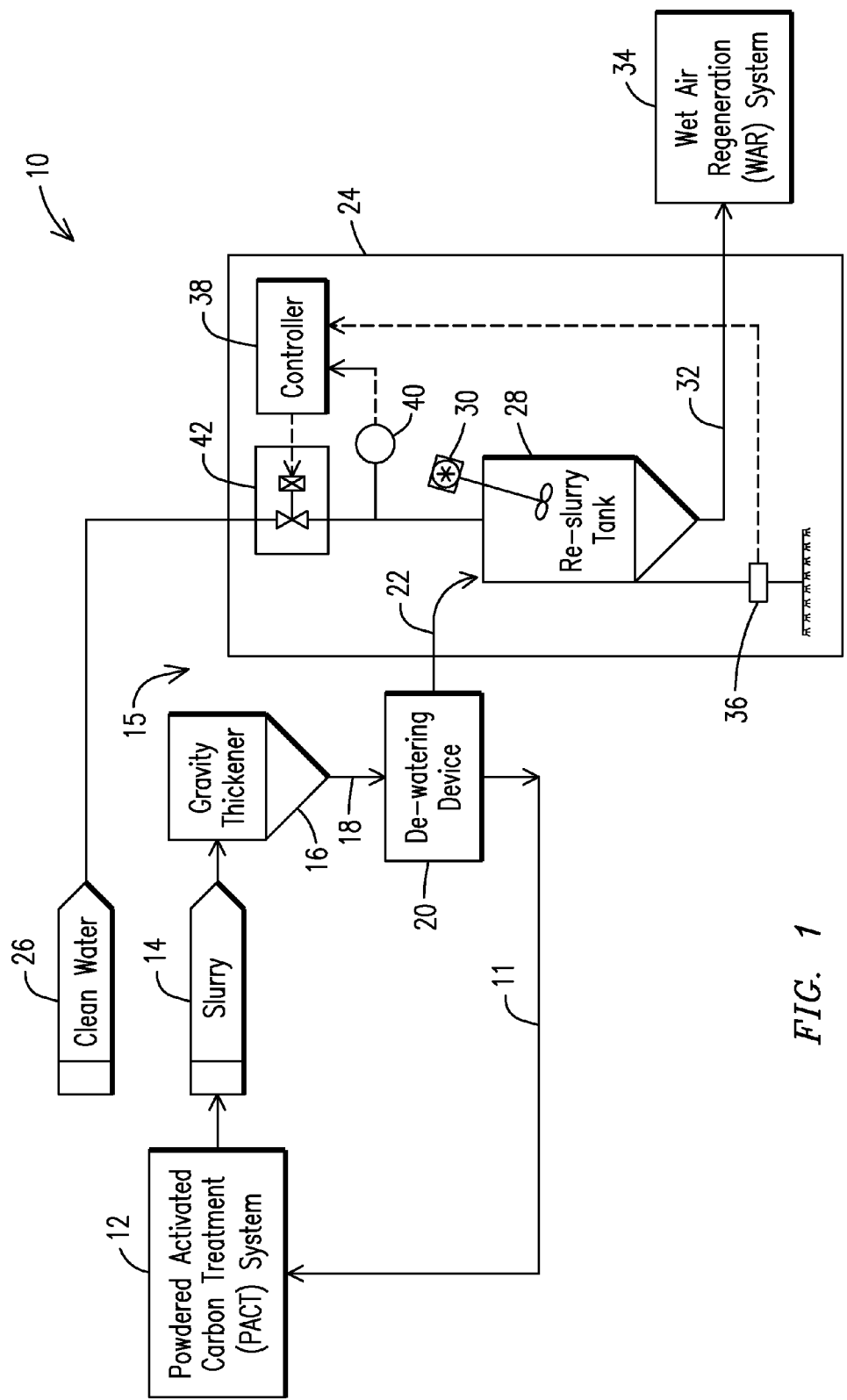
FIG. 1 is a schematic representation of one non-limiting embodiment of a system embodying aspects of the present invention.

FIG. 1 is a more detailed schematic illustration of one non-limiting embodiment of a system embodying aspects of the present invention. The system may include a powdered activated carbon treatment (PACT) system 12, which may generate waste water slurry 14 containing spent carbon and biological material and at least one dissolved soluble component. In one non-limiting embodiment, slurry 14 may have a water content ranging from approximately 95% to approximately 97% (solids content of 5% to 3%). Non-limiting examples of soluble components may include water-hardening components, such as calcium, magnesium, iron, etc., and may further include corrosive (or corrosive-contributing) components, such as chloride, fluoride, etc. Slurry 14 may be conditioned in a gravity thickener 16 (e.g., a sedimentation tank, which in certain embodiments may be provided as part of PACT system 12) to provide a thickened sludge 18, which in one non-limiting embodiment may have a water content ranging from approximately 90% to approximately 93%.

A solubles concentration reduction apparatus 15 may be disposed upstream from a WAR system 34 and may be configured to process sludge received from PACT system 12 to reduce an amount of at least one soluble component present in such sludge. Apparatus 15 may be further configured to reconstitute the processed sludge to supply a sludge feed having reduced ion concentration (re-slurried sludge 32) and having appropriate solids content to the wet air regeneration (WAR) system 34. As will be appreciated by those skilled in the art, the solids content (e.g., biomass and adsorbed organics in the spent carbon) in the feed supplied to the WAR system 34 constitutes a fuel used by the WAR system for auto-thermal regeneration.

In the embodiment of FIG. 1, apparatus 15 includes a dewatering device 20 (e.g., a water-separation device) that may be coupled to receive sludge from the PACT system, such as thickened sludge 18 conditioned by gravity thickener 16; or, alternatively, may directly receive unconditioned slurry 14. In either case, dewatering device 20 is configured to process the material received from PACT system 12 through removal of at least a portion of the water containing the at least one soluble component to supply a dewatered sludge (e.g., sludge cake 22), which in one non-limiting embodiment may have a water content ranging from approximately 50% to approximately 65%. When the terms slurry and sludge are used herein relative to each other, it is intended that a sludge has a lower water content than a slurry. However, when the term sludge is used alone, such as in the claims, is intended to include a variety of water contents including those described in relative terms as being a slurry.

As will be readily appreciated by those skilled in the art, dewatering device 20 may be implemented in any of various forms. Non-limiting examples of the dewatering device may be a centrifuge, a vacuum filter, a belt filter press, a screw press, a belt press, or a washing centrifuge or elutriation device. Water removed by the dewatering device 20 may be recirculated back to the PACT system 12 by line 11.

It is contemplated that in certain applications the sludge-thickening functionality provided by gravity thickener 16 could be performed by dewatering device 20, and this would avoid a need for gravity thickener 16. Elimination of gravity thickener 16 may reduce cost and would be helpful in water treatment applications subject to real estate area constraints.

Apparatus 15 further includes a re-slurrying device 24 coupled to receive dewatered sludge cake 22 from dewatering device 20 and to add water 26 which is essentially free of the undesired soluble components in order to produce re-slurried sludge 32. Water 26 may be demineralized water, reverse osmosis (RO) permeate, or other water, naturally-available or processed for appropriate removal of the undesirable soluble contaminants. Re-slurrying device 24 essentially reconstitutes the dewatered sludge cake 22 to appropriate solids content for wet air regeneration (WAR) system 34. It will be appreciated that there could be several dewatering and re-slurrying steps iteratively performed to achieve a desired level of reduction of the soluble components in the solubles-containing water and subsequent replacement with water which is practically free of such soluble components. The inventor recognizes that there is a cost for supplying water 26, however, that cost is less than the savings realized from the reduced scale removal maintenance schedule allowed by the present invention.

In one non-limiting embodiment, re-slurrying device 24 may take the form of a re-slurry tank 28, which may include a mixer 30 or other device to re-slurry the sludge, and which receives dewatered sludge cake 22 and clean water 26 to generate a re-slurried sludge 32, which in one non-limiting embodiment may have a water content ranging from approximately 90% to approximately 93% to be supplied to WAR system 34 for regeneration of spent carbon. That is, re-slurried sludge 32 may be viewed not just as sludge filtered or cleansed from the undesirable soluble components; but also as sludge appropriately reconstituted to have a solids content optimized for processing by WAR system 34. This additional degree of active control of the water content of the fuel entering the WAR system 34 may provide process control advantages currently unavailable in prior art water treatment systems which relies on the action of a passive thickener to control the water content of that fuel.

In one non-limiting example, re-slurrying device 24 may include a weight sensor 36, which may be coupled (e.g., wired or wirelessly) to supply to a controller 38 (e.g., a programmable logic controller (PLC), microprocessor, Application Specific Integrated Circuit (ASIC), etc.) process data indicative of weight of the content in re-slurry tank. A flow sensor 40 may be coupled to supply to controller 38 data indicative of the flow rate of clean water 26 into re-slurry tank 28. Controller 38 may be configured to calculate a rate of content weight change in re-slurry tank 28, which may be used to generate a control signal for actuating a valve 42 arranged to control the flow of clean water 26 into re-slurry tank 28, thereby providing active control of the water content of slurry 32.

Accordingly, under computerized control, one can selectively and dynamically control any desirable percent of solids content (within practical limits) for the re-slurried sludge 32 being supplied to WAR system 34. This control functionality can be advantageous since the solids content of the sludge being provided to the WAR system 34 influences the heating value of such sludge, and this can provide enhanced control versatility regarding the operation of the WAR system.

Figure 2:
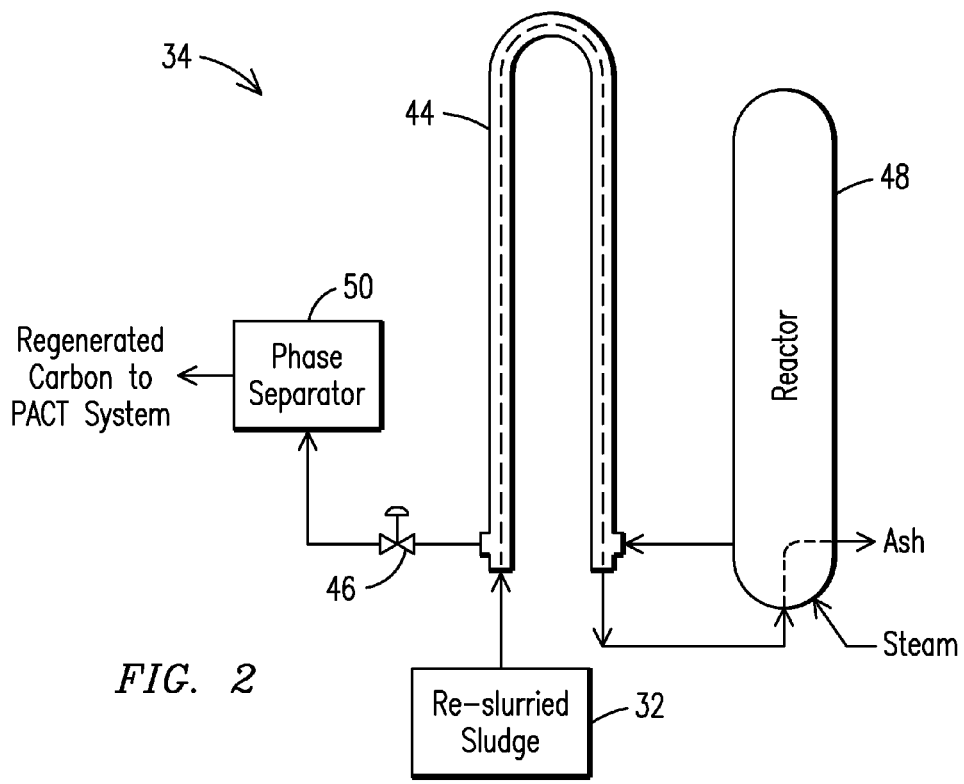
FIG. 2 is a simplified schematic of a wet air regeneration (WAR) system which may benefit from aspects of the present invention.

FIG. 2 is a simplified schematic illustrating certain components of WAR system 34 which may benefit from aspects of the present invention. WAR system 34 may include a heater such as regenerative heat exchanger 44, one or more pressure control valves 46, a reactor 48, and a phase separator 50. Absent the solubles concentration reduction apparatus 15 of the present invention, these components would have been susceptible to scaling, which in turn would have required performing costly and burdensome scale-removing services, sometimes on a weekly basis. In accordance with aspects of the present invention, a frequency of such scale-removing services may now be advantageously reduced in response to the reduced amount of hardening components (e.g., calcium, magnesium, iron, etc.) in re-slurried sludge 32. Additionally, in accordance with further aspects of the present invention, the components of the WAR system 34 may now be made with relatively less costly materials (e.g., 316L stainless steel versus the exotic materials typically used in the prior art such as nickel based alloys, titanium, Alloy 20 nickel-chromium-molybdenum stainless steel Hastelloy® C-276 alloy, etc.) having a reduced corrosion-resistance as a result of the reduced amount of corrosive components in re-slurried sludge 32. As will be appreciated by one skilled in the art, these exotic materials presently can have costs ranging from approximately four times to approximately ten times the cost of stainless steels that are more susceptible to stress corrosion cracking.

Example

A typical PACT system including a thickener 16 may produce spent carbon sludge 18 at 7% solids containing a 1000 mg/l Cl$^-$ concentration to be treated in a WAR system. This flow would require that a corrosion resistant material such as titanium be used as a material of construction for the high temperature/high pressure components of the WAR system. If that flow were treated in dewatering device 20 to produce a 35% solid sludge cake 22 which was then diluted back to 7% solids re-slurried sludge 32, the resulting concentration of Cl$^-$ in the re-slurried sludge 32 would be 140 mg/l Cl$^-$. according to the following calculations:

Per pound of 7% solid sludge there is 13.29 pounds of water (14.29 pounds sludge×0.07=1 pound water)

Per pound of 35% solid sludge there is 1.86 pounds of water (2.86 pounds sludge×0.35=1 pound water)

Thus, to dewater from 7% solids to 35% solids, one removes 13.29−1.86=11.43 lbs. of water per pound of solids, which in absolute terms is approximately 11.43/13.29=86% of the original water and consequently 86% of the soluble components (e.g., Cl). Since only 14% of the Cl remains, the reduced concentration after re-watering is 140 mg/l Cl$^-$ (14% of 1000), which would allow use of 316L stainless steel as a material of construction.

The present invention may be incorporated into an existing water treatment plant to realize operational cost savings by adding the solubles concentration reduction equipment 104 in flow communication between an existing PACT system 106 and WAR system 108. Alternatively, the invention may be incorporated into a newly designed water treatment plant, thereby realizing the manufacturing and capital cost savings resulting from the use of less expensive materials as well as the inherently lower operational costs when compared to prior art systems.

While the solubles concentration reduction device illustrated in FIG. 1 is a dewatering/rewatering device, one skilled in the art will appreciate that other techniques and devices may be used to accomplish this function, such as an ion exchange device for the solubles concentration reduction equipment 104 of FIG. 4, for example.

In the foregoing detailed description, various details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation. Accordingly, it is intended that the invention be limited only by the spirit and scope of the appended claims.

The invention claimed is:

1. A water treatment apparatus comprising:
   a powdered activated carbon treatment (PACT) system;
   a wet air regeneration (WAR) system in fluid communication with the PACT system and configured to regenerate spent carbon from the PACT system; and
   a solubles concentration reduction apparatus in fluid communication between the PACT system and the WAR system and configured to reduce a concentration of a soluble material associated with the spent carbon upstream of the WAR system, wherein the solubles concentration reduction apparatus comprises:
   a dewatering device coupled to receive sludge containing the soluble material from the PACT system and to produce dewatered sludge;
   a re-slurrying device coupled to receive the dewatered sludge from the dewatering device and to produce re-slurried sludge, wherein the re-slurrying device comprises a re-slurry tank configured to receive the dewatered sludge from the dewatering device, and is further configured to receive the water essentially free of the soluble material, wherein the re-slurrying device further comprises a sensor coupled to supply a signal indicative of a content weight in the re-slurry tank, and a controller coupled to receive the signal from the sensor and configured to calculate a rate of content weight change in the re-slurry tank, the controller further configured to generate in response to the calculated rate of content weight change a control signal for selectively actuating a valve which controls an amount of water added to the dewatered sludge.

2. The apparatus of claim 1, wherein the solubles concentration reduction apparatus comprises an ion exchange device.

3. The apparatus of claim 1, wherein the WAR system comprises a reactor made of a material sensitive to stress corrosion cracking.

4. The apparatus of claim 1, wherein the dewatering device is selected from the group consisting of a centrifuge, a vacuum filter, a filter press, a screw press, a belt press, and a washing centrifuge.

5. The apparatus of claim 1, further comprising a thickener device disposed upstream from the dewatering device to precondition the sludge received by the dewatering device.

6. An improvement to an existing water treatment apparatus, the existing water treatment apparatus comprising a powdered activated carbon treatment (PACT) system and a wet air regeneration (WAR) system configured to process spent carbon sludge received from the PACT system, the improvement comprising an apparatus installed in fluid communication between the PACT and the WAR to reduce a concentration of at least one soluble component present in the sludge and to reconstitute the sludge to have a predetermined water/solids concentration upon delivery to the WAR system;
   a dewatering device coupled to receive the sludge from the PACT system and to produce dewatered sludge;
   a re-slurrying device coupled to receive the dewatered sludge from the dewatering device and to add water substantially free of the at least one soluble component to the dewatered sludge to produce the reconstituted sludge; and
   a controller responsive to a signal indicative of a content weight in the re-slurrying device, the controller configured to calculate a rate of content weight change in the re-slurrying device, the controller further configured to generate, based on the calculated rate of content weight change, a control signal to control an amount of water added to the dewatered sludge.

7. The improvement of claim 6, wherein the dewatering device is selected from the group consisting of a centrifuge, a vacuum filter, a filter press, a screw press, a belt press, and a washing centrifuge.

8. The improvement of claim 7, wherein the improvement further comprises an ion exchange device.

9. A method comprising:
   processing sludge received from a powdered activated carbon treatment (PACT) system to reduce a concentration of at least one soluble ion present in the sludge, wherein said processing comprises:
   removing from the sludge at least a portion of water containing the at least one soluble ion to create a dewatered sludge;
   adding water substantially free of the at least one soluble ion to the dewatered sludge to produce re-slurried sludge in a re-slurry device for delivery to a wet air regeneration (WAR);
   sensing a signal indicative of a content weight in the re-slurry device;
   calculating a rate of content weight change in response to the sensed signal, and
   controlling, based on the calculated rate of content weight change, a percentage solids content in the re-slurried sludge to a desired value, and then reactivating carbon in the sludge in the WAR system.

* * * * *